United States Patent
Palani (10) Patent No.: US 9,191,070 B2
(45) Date of Patent: Nov. 17, 2015

(54) MULTI-INSTANCE POWERLINE COMMUNICATION SYSTEM

(71) Applicant: QUALCOMM Incorporated, San Diego, CA (US)

(72) Inventor: Kesavamurthy Palani, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/662,405

(22) Filed: Oct. 26, 2012

(65) Prior Publication Data

US 2014/0119233 A1    May 1, 2014

(51) Int. Cl.
*H04L 12/28* (2006.01)
*H04B 3/54* (2006.01)

(52) U.S. Cl.
CPC ............ *H04B 3/544* (2013.01); *H04L 12/2832* (2013.01); *H04B 2203/5445* (2013.01); *H04L 2012/2843* (2013.01)

(58) Field of Classification Search
CPC .. H04L 2012/2843; H04B 3/54; H04B 3/542; H04B 3/544; H04B 3/546
USPC .......................................... 370/254, 389, 390
See application file for complete search history.

(56) References Cited

U.S. PATENT DOCUMENTS

| 2002/0075870 | A1* | 6/2002 | de Azevedo et al. .......... 370/390 |
| 2007/0058732 | A1 | 3/2007 | Riedel et al. |
| 2007/0271398 | A1 | 11/2007 | Manchester et al. |
| 2008/0301446 | A1* | 12/2008 | Yonge et al. ................... 713/171 |
| 2009/0034552 | A1 | 2/2009 | Yonge, III et al. |
| 2010/0110911 | A1* | 5/2010 | Yin ................................ 370/252 |
| 2010/0220593 | A1* | 9/2010 | Fujiwara et al. .............. 370/235 |
| 2010/0299401 | A1* | 11/2010 | Lloyd ............................ 709/209 |
| 2011/0280332 | A1 | 11/2011 | Yonge, III |

(Continued)

FOREIGN PATENT DOCUMENTS

| WO | 03077442 A1 | 9/2003 |
| WO | 2009006685 A1 | 1/2009 |
| WO | 2014066788 | 5/2014 |

OTHER PUBLICATIONS

HomePlug AV Specification, Version 1.1. Available from HomePlug Powerline Alliance http://www.homeplug.org May 21, 2007, 289-341 pages.

(Continued)

*Primary Examiner* — Kan Yuen
(74) *Attorney, Agent, or Firm* — DeLizio Law, PLLC (57) ABSTRACT

A multi-instance powerline communication device broadcasts discovery messages to network devices of a plurality of communication networks. Identification information associated with the network devices is determined. Each of the network devices is associated with a corresponding one of the plurality of communication networks and one of a plurality of powerline communication instances. The multi-instance powerline communication device receives a network packet and determines a destination network device for the network packet. A network identifier of the communication network of the destination network device is determined. The multi-instance powerline communication device determines the powerline communication instance associated with the communication network and processes the network packet using the powerline communication instance and the network identifier of the communication network.

35 Claims, 6 Drawing Sheets

(56) References Cited

U.S. PATENT DOCUMENTS

2012/0087503 A1*  4/2012  Watson et al. .................. 381/23
2012/0207163 A1   8/2012  Schrum
2013/0051264 A1*  2/2013  Wang et al. .................. 370/252
2013/0279407 A1* 10/2013  Rahman ........................ 370/328

OTHER PUBLICATIONS

"PCT Application No. PCT/US2013/066861 International Search Report", Apr. 23, 2014, 17 pages.

* cited by examiner

MULTI-INSTANCE POWERLINE COMMUNICATION SYSTEM

BACKGROUND

Embodiments of the inventive subject matter generally relate to the field of communication networks, and, more particularly, to a multi-instance powerline communication technique.

Powerline communication (PLC) is a wired communication technology that utilizes electrical power wiring for transmitting and receiving communication signals. PLC techniques typically utilize a PLC device to facilitate communication between electronic/electric devices (e.g., computer, digital video recorder (DVR), washing machine, door lock, electric motor, etc.). A PLC device can typically be configured with a network membership key (NMK) of a single communication network. The PLC device, when configured with the NMK of a communication network, can typically only communicate with PLC devices in the communication network associated with that particular NMK. In some cases, for a network device to communicate with devices in multiple communication networks, the network device can utilize PLC to communicate with devices in a first communication network at one time and communicate with devices in a second communication network at a different time by changing the NMK in the PLC device.

SUMMARY

Various embodiments are disclosed of a multi-instance powerline communication device executing a plurality of powerline communication instances associated with a corresponding plurality of communication networks. At least one of the plurality of powerline communication instances is associated with a corresponding one of the plurality of communication networks. In one embodiment, discovery messages are broadcast from each of the plurality of communication networks to network devices of the plurality of communication networks. Identification information associated with the network devices of the plurality of communication networks is determined based on response messages received from each of the network devices in response to the discovery messages. Each of the network devices is associated with one of the plurality of powerline communication networks and one of the plurality of powerline communication instances based, at least in part, on the identification information associated with the network devices included in the response messages. In another embodiment, a network packet is received at the multi-instance powerline communication device. A destination network device for the network packet is determined, and a network identifier of the communication network of the destination network device is also determined. The powerline communication instance associated with the communication network is selected and the network packet is transmitted using the powerline communication instance and the network identifier of the communication network.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a multi-instance unit and a packet processing unit for implementing a multi-instance powerline communication technique, embodiments are not so limited. In some embodiments, the multi-instance powerline communication technique may be implemented using other units of a PLC device, or a single unit performing the functions of the multi-instance unit and the packet processing unit. In other instances, well-known instruction instances, protocols, structures and techniques have not been shown in detail in order not to obfuscate the description.

A multi-instance PLC device can implement the multi-instance powerline communication technique to allow a network device or a network service provider to communicate with network devices in multiple communication networks. The multi-instance PLC device enables communication with network devices in multiple communication networks at the same time without changing the NMK in the multi-instance PLC device and without utilizing multiple PLC devices. The multi-instance PLC device also allows a network service provider or a network administrator to access and manage devices in multiple communication networks. For example, the network service provider can utilize a single multi-instance PLC device to distribute multiple services (e.g., television, voice, data, etc.) to devices in multiple communication networks. In another example, a network administrator or network user (remote or local) can also control (e.g., turn on, turn off, etc.) devices in multiple communication networks using a single multi-instance PLC device.

In some embodiments, the multi-instance PLC device implements each powerline communication instance (hereinafter "instance") as a distinct virtual PLC device and each instance corresponds to a communication network. The multi-instance PLC device keeps track of the multiple instances using an instance identifier (ID). The network devices in communication networks identify each of the multiple instances in the multi-instance PLC as a unique PLC device. The multi-instance PLC device discovers PLC devices in multiple communication networks and maintains information about network devices corresponding to each of the instances. On receiving a network packet destined to a network device, the multi-instance PLC device identifies the destination network device for the network packet, a network ID corresponding to the communication network of the destination network device, and the instance corresponding to the network ID. The multi-instance PLC device constructs a powerline data frame for transmission using the appropriate instance and the network ID. Also, on receiving a powerline data frame, the multi-instance PLC device determines an instance corresponding to the network ID in the powerline data frame. The multi-instance PLC device utilizes the instance to process the received powerline data frame.

Figure 1:
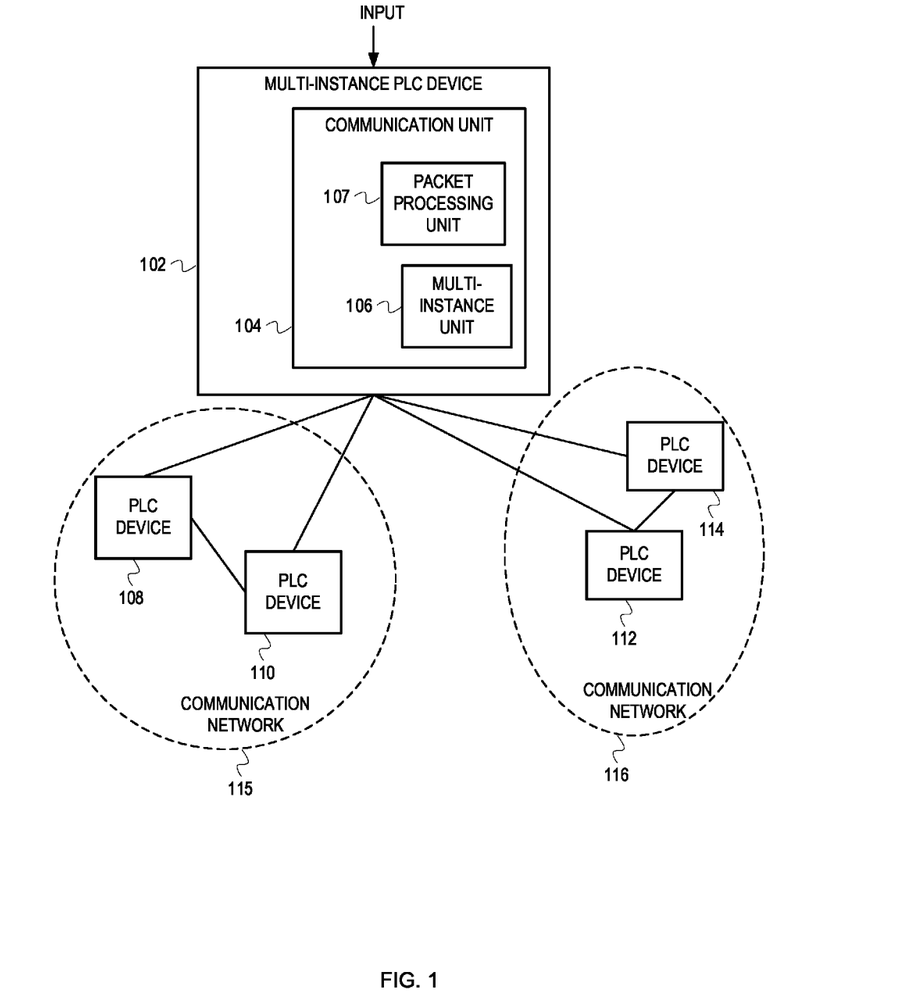
FIG. 1 depicts an example conceptual diagram of a multi-instance powerline communication associated with powerline communication devices in multiple communication networks.

FIG. 1 depicts an example conceptual diagram of a multi-instance powerline communication associated with powerline communication devices in multiple communication networks. FIG. 1 includes a multi-instance PLC device 102 having a communication unit 104. The multi-instance PLC device 102 can receive an input, as depicted in FIG. 1, from a host device (e.g., a computer, a laptop, etc.) coupled to the multi-instance PLC device 102, or from a network device coupled to a remote PLC device. For example, the input to the multi-instance PLC device 102 may be via Ethernet over Coax (EoC), Broadband over Power Line (BPL), etc. The communication unit 104 in the multi-instance PLC device 102 includes a packet processing unit 107 and a multi-instance unit 106. The multi-instance PLC device 102 may be based on one or more of the PLC specifications (e.g., HomePlug AV, HomePlug AV2, HomePlug Green PHY etc.). The packet processing unit 107 and the multi-instance unit 106 allow the multi-instance PLC device 102 to implement the multi-instance powerline communication technique and each of the instances can perform operations of a standard standalone PLC device. The multi-instance unit 106 keeps track of the multiple instances, the communication networks associated with each of the multiple instances and the PLC devices in the respective communication networks. For example, for each of the communication networks, the multi-instance unit 106 broadcasts a discovery beacon (e.g., a discovery message) having a network identifier of the respective communication network. A network ID is a unique identifier for a communication network. In some implementations, the network ID can be based on an NMK associated with the communication network. For example, the network ID can be based on an NMK associated with the communication network and also security level information of the communication network. In one specific non-limiting example, the network ID can be a combination or concatenation of a 52-bit NMK and a 2-bit security level indicator. On receiving a response (e.g. a response message) to the discovery beacon of a communication network, the multi-instance unit 106 determines the PLC devices in the respective communication network. In one implementation, the multi-instance unit 106 keeps track of the multiple instances using instance IDs (e.g., media access control (MAC) address, or an instance ID number different from the terminal equipment identifier, etc.). Each of the multiple instances is recognized by a terminal equipment identifier by PLC devices other than the multi-instance PLC device 102 in the respective communication network. The multi-instance unit 106 also maintains a mapping table (e.g., an instance ID to network ID mapping table) to determine a communication network associated with each of the instances. In some implementations, the multi-instance unit 106 can utilize different data structures (e.g., a relational database, a spreadsheet, etc.) to maintain information about the communication networks associated with the instances. The packet processing unit 107 performs operations for processing powerline communications using the appropriate instance. For example, the packet processing unit 107 constructs a powerline data frame using the appropriate network ID (corresponding to an instance ID) for transmission of a network packet to a destination PLC device. Similarly, on receiving a powerline data frame, the packet processing unit 107 determines the appropriate instance for processing the powerline data frame. The multi-instance unit 106 and the packet processing unit 107 may include one or more components and program instructions for implementing the multi-instance powerline communication technique. The number of instances that the multi-instance PLC device 102 can implement depends on its capabilities (e.g., processing speed, powerline frame conversion, hardware and software capabilities, etc.). For simplification, all components of the communication unit 104 and the multi-instance PLC device 102 are not depicted in FIG. 1.

FIG. 1 also includes PLC devices 108 and 110 in a communication network 115 (e.g., an audio-video logical network (AVLN), etc.), and PLC devices 112 and 114 in a communication network 116. The PLC devices 108, 110, 112 and 114 may be based on one or more of the PLC specifications (e.g., HomePlug AV, HomePlug AV2, HomePlug Green PHY etc.). The PLC devices 108, 110, 112 and 114 are capable of associating with a single communication network at a time. The multi-instance PLC device 102 is capable of associating with the communication network 115 and the communication network 116 at the same time using the respective instance for each communication network. For example, the multi-instance PLC device implements a first instance associated with the communication network 115, and a second instance associated with the communication network 116. The multi-instance PLC device 102 can communicate with the PLC devices 108 and 110 using the first instance. The multi-instance PLC device 102 can communicate with the PLC devices 112 and 114 at the same time using the second instance.

The multi-instance PLC device 102 can be utilized in several applications. For example, in a first application, the multi-instance PLC device 102 allows a host device connected to the multi-instance PLC device 102 to simultaneously communicate with network devices in two or more communication networks (e.g., the communication networks 115 and 116). In a second application, a network service provider can use a single master/head-end unit (which utilizes the multi-instance PLC device 102) to distribute services to slave/end-point units (e.g., PLC devices 112 and 114 in the communication networks 115 and 116), while applying a certain set of restrictions on the slave/end-point units in each of the communication networks 115 and 116. In a third application, a user can remotely manage network devices in the communication networks 115 and 116 using a single hybrid PLC router (which utilizes the multi-instance PLC device 102). The multi-instance PLC device 102 and the applications of the multi-instance PLC device 102 are further described below with reference to FIGS. 2-5.

Figure 2A:
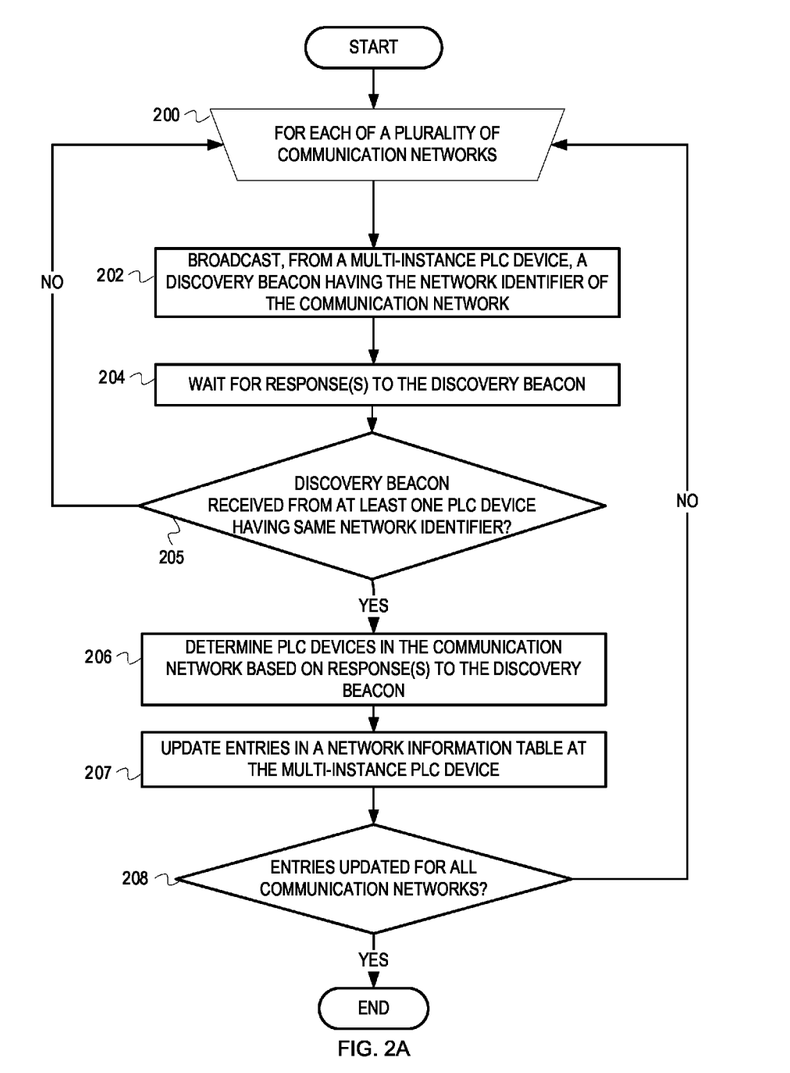
FIG. 2A illustrates a flow diagram of example operations for determining powerline communication devices in multiple communication networks.

FIG. 2A illustrates a flow diagram of example operations for determining powerline communication devices in multiple communication networks.

At block 200, a loop is started for each of a plurality of communication networks. For example, the multi-instance unit 106 of the multi-instance PLC device 102 (as described above with reference to FIG. 1) starts a loop for the communication network 115. The loop includes the operations at blocks 202, 204, 206, 207 and 208.

At block 202, a discovery beacon having the network ID of the communication network (corresponding to the current iteration of the loop) is broadcast from the multi-instance PLC device. In one implementation, the multi-instance unit 106 of the multi-instance PLC device 102 broadcasts the discovery beacon having the network ID of the communication network 115. The multi-instance unit 106 may receive a discovery beacon(s) having the same network ID from PLC devices (e.g., the PLC devices 108 and 110), in response to broadcasting the discovery beacon. In a communication network, typically a central coordinator sends a discovery beacon (which is sometimes referred to as a central beacon) to the PLC devices and the PLC devices join as role stations. In some implementations, the multi-instance unit 106 may send a discovery beacon (i.e., a central beacon) for the communication network when one of the instances of the multi-instance unit 106 serves as the central coordinator for the corresponding communication network. It is noted that one or more of the instances of the multi-instance unit 106 may serve as the central coordinator for the corresponding communication network(s). It is further noted that one or more of the instances of the multi-instance unit 106 may serve as role stations when not configured as the central coordinator of the communication network. In some implementations, when the communication network already has a central coordinator, the multi-instance unit 106 may respond (for the respective instance) to a discovery beacon (i.e., a central beacon) sent by a central coordinator and join the communication network as a role station.

At block 204, a wait period is started for a response(s) to the discovery beacon. In one implementation, the multi-instance unit 106 of the multi-instance PLC device 102 waits for a pre-determined time duration for the response(s) to the discovery beacon from other PLC devices with the same network ID. As described above in block 202, the response(s) to the discovery beacon may be other discovery beacons from the PLC devices having the same network ID.

At block 205, it is determined whether a discovery beacon is received from at least one PLC device having same network ID. In one implementation, the multi-instance PLC unit 102 determines whether a discovery beacon with the same network ID (as the network ID broadcast in the discovery beacon at block 202) is received from at least one PLC device. If a discovery beacon with the same network ID is received from at least one PLC device, control flows to block 206. If a discovery beacon with the same network ID is not received from at least one PLC device, there is no other PLC device in the communication network corresponding to the network ID, and control loops back to block 202.

At block 206, the PLC devices in the communication network are determined based on the response(s) to the discovery beacon. In one implementation, the multi-instance unit 106 determines the PLC devices in the communication network 115 based on the response(s) to the discovery beacon that indicate a particular network ID associated with the communication network. For example, a response to the discovery beacon includes addresses (e.g., a terminal equipment identifier, etc.) of the PLC devices 108 and 110 sending the response. Based on the addresses and network ID that are received, the multi-instance unit 106 can determine that the PLC devices 108 and 110 are associated with the communication network 115. In some implementations, the multi-instance unit 106 can also receive responses from a remote PLC device (e.g., a PLC device coupled via a bridge).

At block 207, entries are updated in a network information table at the multi-instance PLC device. In one implementation, the multi-instance unit 106 updates the entries in a network information table at the multi-instance PLC device 102. For example, the multi-instance unit 106 updates the device addresses of the PLC devices 108 and 110 in a network information table corresponding to the communication network 115. When the multi-instance unit 106 receives responses from a remote PLC device, the multi-instance unit 106 updates remote bridging entries for the network devices (e.g., updates MAC addresses of a local/remote bridge) in the network information table for the communication network 115. The multi-instance unit 106 also maintains an instance ID to network ID mapping table. For example, a network information table corresponds to a unique network ID, and the instance ID to network ID mapping table helps in identifying the appropriate network information table to be utilized for an instance having a particular instance ID. In other words, when an instance associated with a particular instance ID will be used, the instance ID to network ID mapping table is accessed to determine the network ID associated with the particular instance ID, and then the network information table associated the network ID.

At block 208, it is determined whether entries have been updated for all communication networks. In one implementation, the multi-instance unit 106 determines whether entries have been updated for all communication networks (i.e., the communication networks 115 and 116) in the network information table of the respective communication networks (or respective instances). If entries have not been updated for all communication networks, the control loops back to block 200. If entries have been updated for all communication networks, the multi-instance unit 106 concludes the operations.

Figure 2B:
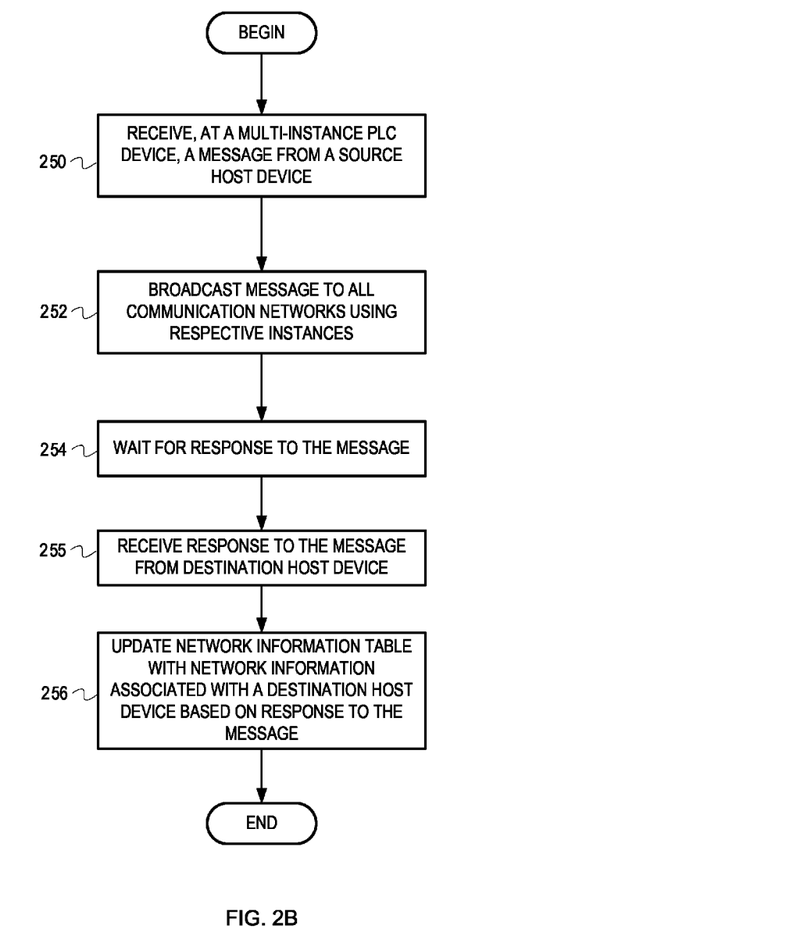
FIG. 2B illustrates a flow diagram of example operations for determining a communication network associated with a destination host device using a multi-instance PLC device.

FIG. 2B illustrates a flow diagram of example operations for determining a communication network associated with a destination host device using a multi-instance PLC device.

At block 250, a message is received at the multi-instance PLC device from a source host device. In one implementation, the multi-instance PLC device 102 receives a message from a source host device (e.g., a host device coupled with the multi-instance PLC device 102). For example, when the source host device is scheduled to communicate with a destination host device (e.g., a host device coupled with PLC device 110 in communication network 115), the source host device may initially send a message (e.g., an address request protocol (ARP) message for the destination host device) to the multi-instance PLC device 102 that manages/routes the network traffic to/from the communication networks 115 and 116. In other examples, the destination host device may be a host device in another communication network (e.g., a host device coupled with the PLC device 112 in the communication network 116).

At block 252, the message is broadcast to all communication networks using the respective instances. In one implementation, the multi-instance unit 106 broadcasts the message using each of the PLC instances associated with the multi-instance PLC device 102 to each corresponding communication network. For example, the multi-instance unit 106 broadcasts the message to communication network 115 using a first instance, and to the communication network 116 using a second instance that is difference than the first instance. Hence, the broadcast message is sent to each of the remote PLC devices in the communication networks (e.g., the PLC device 110 in the communication network 115). In some implementations, the multi-instance unit 106 broadcasts the message to all communication networks the first time; i.e., when network information associated with the destination host device is not up-to-date in one or more remote bridge MAC entry tables associated with corresponding PLC instances. The respective instances to use for broadcast in different communication networks may be determined from an instance ID to network ID mapping table (e.g., the table that was created as described above in FIG. 2A).

At block 254, a response to the message is awaited. In one implementation, the multi-instance unit 106 waits for the response to the message from the destination host device to identify the instance associated with the communication network where the destination host device is located. For example, the multi-instance unit 106 may wait for the response from the destination host device until the response is received or until a time-out period. In some embodiments, the multi-instance unit 106 may rebroadcast the message if the response is not received within the time-out period.

At block 255, a response to the message is received from the destination host device. In one implementation, the multi-instance unit 106 receives the response to the message. For example, the response is an ARP response from the destination host device and includes the address (e.g., a MAC address and an IP address) of the destination network device. In one implementation, on receiving the response from the destination host device, the multi-instance unit 106 identifies the communication network associated with the destination host device. For example, the multi-instance unit 106 identifies the remote PLC device (i.e., the PLC device 110) through which the destination host device responds. The multi-instance unit 106 determines the communication network associated with the PLC device 110. The multi-instance unit 106 further identifies the PLC instance associated with the communication network using the instance ID to network ID mapping table. The flow then continues to block 256.

At block 256, a network information table is updated with the network information associated with the destination host device based on the response to the message. In one implementation, the multi-instance unit 106 updates the network information table based on the response to the message (received at block 255). For example, the multi-instance unit 106 updates a network information table associated with the communication network 115 and the corresponding PLC instance. In some implementations, the multi-instance unit 106 updates the device address of the destination host device in a remote bridge MAC entry table associated with the PLC instance. Once the remote bridge MAC entry table is updated, the multi-instance unit 106 can look up the device address of the destination host device in the remote bridge MAC entry table. The multi-instance unit 106 can utilize the PLC instance associated with the remote bridge MAC entry table to process communications destined to the destination host device. Once remote bridge MAC entry table is updated, future communications to the destination host device are sent as unicast communications. When the multi-instance unit 106 receives a communication destined to the destination host device, the multi-instance unit 106 searches for the address of the destination host device in the remote bridge MAC entry tables of all instances. On locating the address of the destination host device in a remote bridge MAC entry table, the multi-instance unit 106 can utilize the PLC instance corresponding to the remote bridge MAC entry table to process the communications destined to the destination host device.

Figure 3:
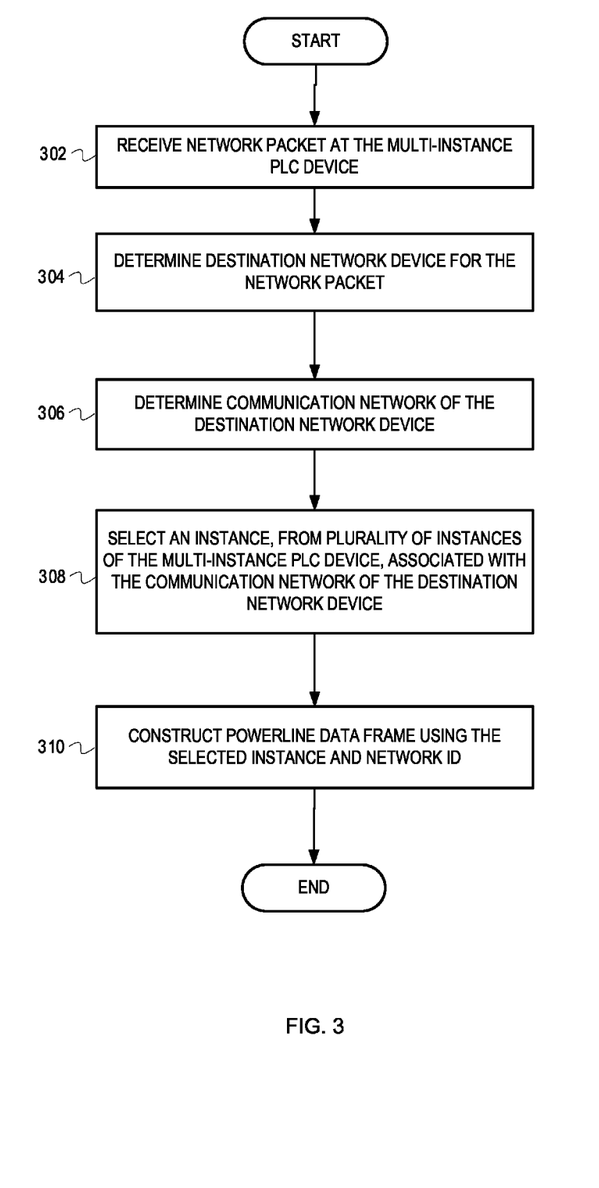
FIG. 3 illustrates a flow diagram of example operations for processing a network packet destined for one of a plurality of communication networks using a multi-instance powerline communication device.

FIG. 3 illustrates a flow diagram of example operations for processing a network packet destined for one of a plurality of communication networks using a multi-instance powerline communication device.

At block 302, a network packet is received at the multi-instance PLC device. In one implementation, the packet processing unit 107 of the multi-instance PLC device 102, as described above with reference to FIG. 1, receives the network packet. The network packet may be a network packet based on a communication network standard (e.g., Ethernet, WLAN, etc.). The network packet may originate from a host device connected to the multi-instance PLC device 102, from processing of a powerline data frame received from another PLC device, or from a service provider on a remote PLC node of that communication network.

At block 304, a destination network device is determined from the network packet. In one implementation, the packet processing unit 107 determines the address (e.g., MAC-48, EUI-48, EUI-64, etc.) of the destination network device from the network packet. The packet processing unit 107 can read the network packet to determine various parameters including a source address, a destination address, etc.

At block 306, a communication network of the destination network device is determined. In one implementation, the packet processing unit 107 determines the communication network (e.g., the communication network 115) of the destination network device based on the address of the destination network device. The packet processing unit 107 can interact with the multi-instance unit 106 to receive information about the communication network of the destination network device. In some implementations, the packet processing unit 107 can determine the network ID associated with the destination network device from the network information tables of the multi-instance PLC device 102. For example, the packet processing unit 107 can determine the network ID associated with the network information tables that are associated with the address of the destination network device.

At block 308, an instance from the plurality of instances of the multi-instance PLC device that is associated with the communication network of the destination network device is selected. In one implementation, the packet processing unit 107 selects the instance ID of a PLC instance (from the plurality of instances of the multi-instance PLC device 102) that is associated with the network ID of the communication network of the destination network device. For example, the packet processing unit 107 selects the instance ID corresponding to the network ID from the instance ID to network ID mapping table.

At block 310, the powerline data frame is constructed using the selected instance of the multi-instance PLC device and a network ID. In one implementation, the packet processing unit 107 utilizes the selected instance to construct the powerline data frame. The powerline data frame also includes the network ID of the communication network (determined at stage 306). In some examples, the powerline data frame also includes a source terminal equipment identifier (STEI), a destination terminal equipment identifier (DTEI), and a short network ID (SNID), etc. The DTEI represents the terminal equipment identifier of a receiving PLC device. In some implementations, the powerline data frame may include an SNID along with the network ID.

Figure 4:
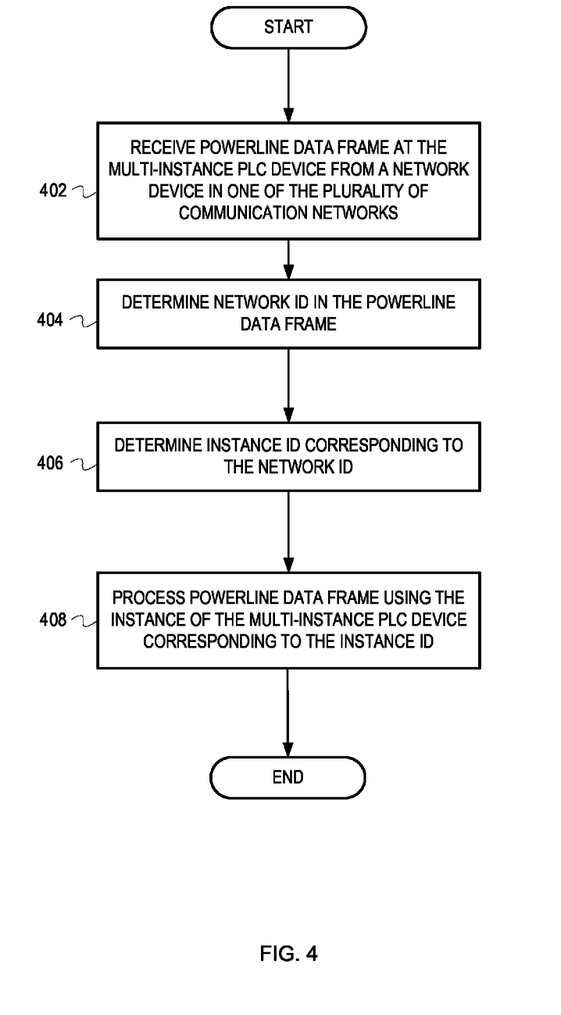
FIG. 4 illustrates a flow diagram of example operations for processing a network packet received from one of the plurality of communication networks using the multi-instance powerline communication device.

FIG. 4 illustrates a flow diagram of example operations for processing a powerline data frame received from one of the plurality of communication networks using the multi-instance powerline communication device.

At block 402, a powerline data frame is received at the multi-instance PLC device from a network device in one of the plurality of communication networks. In one implementation, the packet processing unit 107 in the multi-instance PLC device 102, as described above with reference to FIG. 1, receives the powerline data frame. The powerline data frame may be based on one or more of the powerline network standards (e.g., HomePlug AV, HomePlug AV2, HomePlug Green PHY, etc.).

At block 404, a network ID in the powerline data frame is determined. In one implementation, the packet processing unit 107 of the multi-instance PLC device 102 determines the network ID in the received powerline data frame. The packet processing unit 107 can also determine other parameters in the powerline data frame (e.g., SNID, DTEI, STEI, etc.).

At block 406, an instance ID corresponding to the network ID is determined. In one implementation, the packet processing unit 107 determines the instance ID corresponding to the network ID. For example, the packet processing unit 107 determines the instance ID from an instance ID to network ID mapping table of the multi-instance PLC device 102. The instance ID indicates the instance associated with the communication network corresponding to the network ID.

At block 408, the powerline data frame is processed using the instance of the multi-instance PLC device corresponding to the instance ID. In one implementation, the packet processing unit 107 removes a powerline header in the powerline data frame and forwards a network packet (obtained after removing the powerline data frame), to the instance corresponding to the instance ID (determined at block 408). In one implementation, when the network packet is designated to a host device connected to the multi-instance PLC device 102, the packet processing unit 107 utilizes the instance to forward the network packet on a network interface (e.g., Ethernet interface, WLAN port, etc.) to the host device. In another implementation, when the network packet is destined to a network device connected to a remote PLC device, the packet processing unit 107 constructs a powerline data frame for the network packet (as described in FIG. 3) for transmission to the remote PLC device. The packet processing unit 107 may identify the remote PLC device using its destination TEI and network ID to construct the powerline data frame.

The concept diagram and flow diagrams depicted in FIGS. 1-4 are examples meant to aid in understanding embodiments. Embodiments may comprise additional system components, different system components, and/or may perform additional operations, fewer operations, operations in a different order, operations in parallel, and some operations differently. It is noted that the instance ID to network ID mapping table described in FIGS. 2-4, can be utilized to differentiate powerline data frames received from different PLC devices. For example, on removing the powerline header from the powerline data frame, a packet processing unit can read the address of a destination network device from the network packet (obtained after removing the powerline header) and forward the network packet to the appropriate instance (corresponding to the address of the destination network device).

The multi-instance PLC device (as described above with reference to FIG. 1), can be utilized for several applications. For example, the multi-instance PLC device 102 can facilitate simultaneous communications between a host device connected to the multi-instance PLC device 102 and one or more network devices connected to the PLC device 108 in the communication network 115, and between the host device and one or more network devices connected to the PLC device 112 in the communication network 116. The multi-instance PLC device 102 utilizes a first instance to facilitate communication between the host device and one or more network devices coupled to the PLC device 108. For example, the multi-instance PLC device 102 utilizes the first instance to facilitate communication between a notebook computer (i.e., the host device) communicating with a digital video recorder and a television (i.e., the network devices connected to the PLC device 108). The multi-instance PLC device 102 utilizes a second instance to facilitate communication between the host device and one or more network devices coupled to the PLC device 112. For example, the multi-instance PLC device 102 utilizes the second instance to facilitate communication between an alarm device (i.e., the host device) communicating with a thermostat (i.e., the network device connected to the PLC device 112).

In another application, the multi-instance PLC device 102 allows distribution of services (e.g., IPTV, VoIP, internet, etc.) received at a master/head-end unit from a single service provider while also applying certain restrictions on a set of slaves/end-point units. The master/head-end unit distributes the services to one or more slaves/end-point units using the multi-instance PLC device 102. In some implementations, restrictions (e.g., bandwidth allocation, type of services (IPTV, VoIP), internet access speed etc.), can be applied to a group of slaves/end-point units and a different set of restrictions can be applied to other groups of slaves/end-point units. The slaves/end-point units can be grouped in a communication network (e.g., an AVLN) based on the services to be distributed to the slaves/end-point units. It is noted that separate master/head-end units are typically needed in a conventional system to distribute different services to the group of slave/end-point units. The multi-instance PLC device 102 allows distribution of multiple services while applying certain restrictions using a single master/head-end unit by utilizing multiple instances (implemented by the multi-instance PLC device 102) where each instance corresponds to a different AVLN. The master/head-end unit then distributes a different service(s) to the slaves/end-point units in each of the AVLNs.

In another application, the multi-instance PLC device 102 allows a user to remotely manage devices (e.g., television, washing machine, etc.) in multiple PLC networks using a single hybrid PLC router (Internet Gateway) or other PLC device that implements the multi-instance PLC technique described herein. For example, the hybrid PLC router can be configured to support multiple network technologies (e.g., Ethernet, Wi-Fi, powerline communication, etc.) and also implement the multi-instance PLC unit 106. Typically electronic devices are logically separated in different AVLNs (e.g., an electric motor and a stereo system are typically part of different AVLNs). The multi-instance PLC unit 106 allows the hybrid PLC router to implement multiple PLC instances, and hence allows remote management of the devices in different AVLNs using a single hybrid PLC router.

In some implementations, the PLC central coordinator of a communication network may lock the phase of a discovery beacon transmission to an alternating current (AC) line cycle for providing synchronization to PLC devices (i.e., role stations) in the communication network. For each of the multiple instances (corresponding to the multiple communication networks), there can be multiple and distinct AC line synchronizations. In some implementations, the multi-instance PLC device 102 is configured to synchronize communications associated with the multiple instances to the corresponding multiple AC line synchronizations. For example, the multi-instance PLC device 102 can synchronize communications associated with a first PLC instance to a first AC line synchronization and synchronize communication associated with a second PLC instance to a second AC line synchronization.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
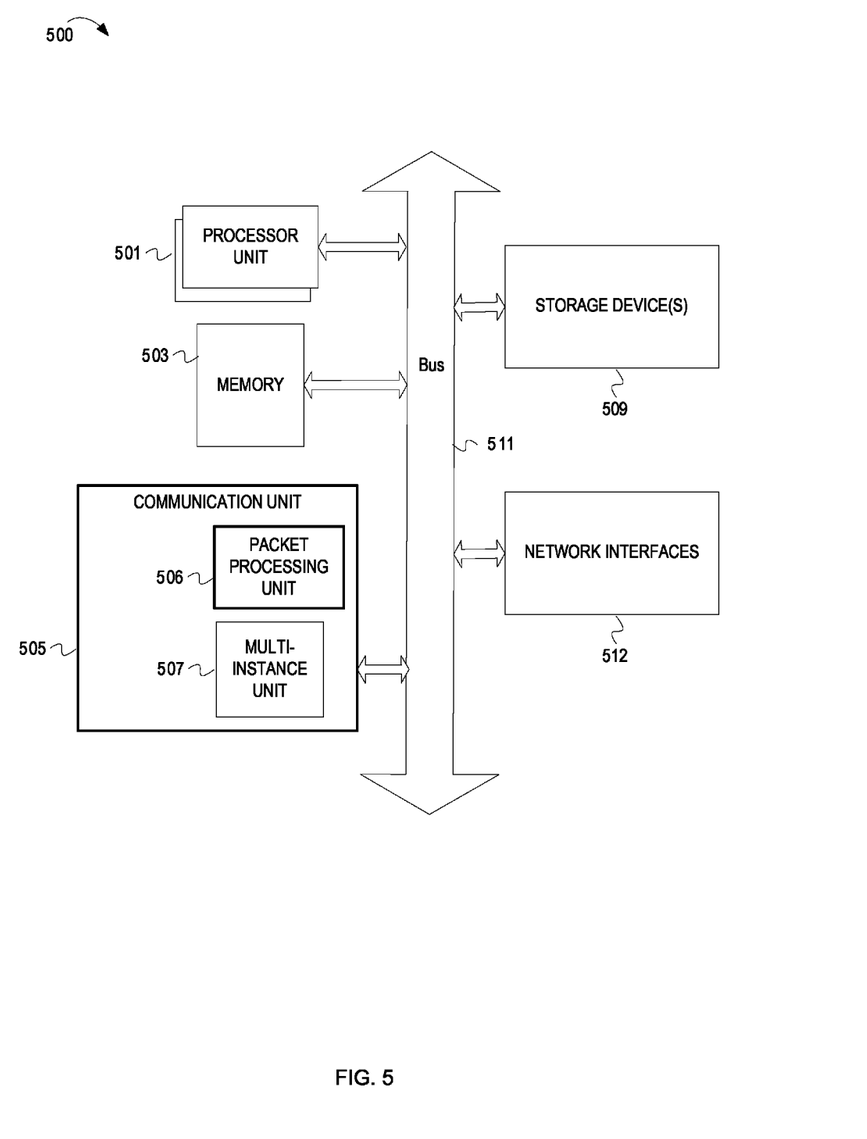
FIG. 5 depicts an example multi-instance powerline communication device.

FIG. 5 depicts an example multi-instance PLC device 500. In some implementations, the multi-instance PLC device 500 may be one a single-input single-output PLC device, a multiple-input multiple-output PLC device, etc. The multi-instance PLC device 500 includes a processor unit 501 (possibly including multiple processors, multiple cores, multiple nodes, and/or implementing multi-threading, etc.). The multi-instance PLC device 500 includes memory 503. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The multi-instance PLC device 500 also includes a bus 511 (e.g., PCI, PCI-Express, AHB™, AXI™, NoC, etc.), a communication unit 505, and a storage device(s) 509 (e.g., optical storage, magnetic storage, network attached storage, etc.). The multi-instance PLC device 500 may also include one or more network interfaces 512; for example, a PLC interface based on one or more PLC standards (e.g., HomePlug® AV, HomePlug® AV2, HomePlug® GreenPHY, etc.), and optionally one or more of an Ethernet over Coax (EoC) network interface, a wireless local area network (WLAN) interface (e.g., 802.11—compatible interface), and an Ethernet interface. The communication unit 505 also includes a packet processing unit 506 and a multi-instance unit 507. The packet processing unit 506 and the multi-instance unit 507 facilitate implementation of multiple PLC instances, as described above with reference to FIGS. 1-4. One or more of these functionalities may be partially (or entirely) implemented in hardware or an application specific integrated circuit. Further, realizations may include fewer or additional components not illustrated in FIG. 5 (e.g., video cards, audio cards, additional network interfaces, peripheral devices, etc.). The processor unit 501, the storage device(s) 509, and the communication unit 505 are coupled to the bus 511. Although illustrated as being coupled to the bus 511, the memory 503 may be coupled to the processor unit 501.

While the embodiments are described with reference to various implementations and exploitations, it will be understood that these embodiments are illustrative and that the scope of the inventive subject matter is not limited to them. In general, techniques for implementing multi-instance PLC as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for multi-instance powerline communication, the method comprising:
    executing, at a multi-instance powerline communication (PLC) device, a plurality of virtual PLC devices, wherein each virtual PLC device communicates with a different corresponding communication network via a same powerline medium;
    broadcasting, using a first virtual PLC device of the plurality of virtual PLC devices, a discovery message for a first communication network;
    receiving at least one response message from one or more network devices in the first communication network in response to the discovery message; and
    associating each of the one or more network devices with the first communication network and with the first virtual PLC device based, at least in part, on receiving the at least one response message.

2. The method of claim 1, wherein the at least one response message includes a device identifier associated with a corresponding network device and a network identifier associated with the first communication network.

3. The method of claim 1, further comprising:
    creating a first mapping table to map each of the one or more network devices with a corresponding communication network; and
    creating a second mapping table to map each communication network with a corresponding virtual PLC device.

4. The method of claim 1, wherein associating each of the one or more network devices with the first communication network and with the first virtual PLC device comprises:
    determining identification information associated with the one or more network devices of the first communication network, wherein the identification information is based, at least in part, on the at least one response message; and
    storing, at the multi-instance PLC device, the identification information in association with a network identifier of the first communication network.

5. The method of claim 1, further comprising:
    storing, at the multi-instance PLC device, network identifiers of each of a plurality of communication networks in association with a corresponding one of the plurality of virtual PLC devices.

6. The method of claim 1, wherein the discovery message comprises a network identifier associated with the first communication network.

7. The method of claim 1, wherein the first communication network comprises audio-video logical networks (AVLNs).

8. The method of claim 1, further comprising determining a media access control (MAC) address associated with each of the one or more network devices.

9. The method of claim 1, further comprising:
    determining identification information associated with the one or more network devices of the first communication network, the identification information based, at least in part, on the at least one response message, wherein the identification information comprises addresses of the one or more network devices and a network identifier of the first communication network.

10. The method of claim 1, further comprising:
    receiving, at the multi-instance PLC device, a first message from a source device;
    broadcasting the first message via each of the plurality of virtual PLC devices to each corresponding communication network;
    receiving a response to the first message from a destination device; and
    updating a first mapping table with network information associated with the destination device based, at least in part, on the response to the first message.

11. The method of claim 10, wherein the first message is an address resolution protocol request and the response to the first message is an address resolution protocol response.

12. The method of claim 1, further comprising:
    rebroadcasting the discovery message in response to a time-out period expiring without the at least one response message being received from the one or more network devices.

13. The method of claim 1, further comprising:
    constructing a powerline data frame for transmission by the first virtual PLC device, the powerline data frame including a network identifier associated with the first communication network.

14. The method of claim 13, wherein the powerline data frame includes a source terminal equipment identifier (STEI), a destination terminal equipment identifier (DTEI), and a short network identification (SNID).

15. The method of claim 1, wherein each virtual PLC device is represented as a unique PLC device on the powerline medium even though the plurality of virtual PLC devices are executed on the same multi-instance PLC device.

16. The method of claim 1,
    wherein the plurality of virtual PLC devices includes at least the first virtual PLC device and a second virtual PLC device,
    wherein the first virtual PLC device communicates with the first communication network using a first network membership key (NMK), and
    wherein the second virtual PLC device communicates with a second communication network using a second NMK.

17. A multi-instance powerline communication (PLC) device, comprising:
    a processor; and
    a memory storing instructions, which when executed by the processor, cause the multi-instance PLC device to:
        execute a plurality of virtual PLC devices, wherein each virtual PLC device communications with a different corresponding communication network via a same powerline medium;
        broadcast, using a virtual PLC device of the plurality of virtual PLC devices, a discovery message for a first communication network;
        receive at least one response message from one or more network devices in the first communication network in response to the discovery message; and
        associate each of the one or more network devices with the first communication network and with the virtual PLC device based, at least in part, on receiving the at least one response message.

18. The multi-instance PLC device of claim 17, wherein the at least one response message includes a device identifier associated with a corresponding network device and a network identifier associated with the first communication network.

19. The multi-instance PLC device of claim 17, wherein the instructions, when executed by the processor, cause the multi-instance PLC device to:
create a first mapping table to map each network device with a corresponding communication network; and
create a second mapping table to map each communication network with a corresponding virtual PLC device.

20. The multi-instance PLC device of claim 19, wherein the instructions, when executed by the processor, cause the multi-instance PLC device to:
determine identification information associated with the one or more network devices of the first communication network, the identification information based, at least in part, on the at least one response message; and
store the identification information in association with a network identifier of the first communication network.

21. The multi-instance PLC device of claim 17, wherein the instructions, when executed by the processor, cause the multi-instance PLC device to:
store network identifiers of each of a plurality of communication networks with a corresponding one of the plurality of virtual PLC devices.

22. The multi-instance PLC device of claim 17, wherein the instructions, when executed by the processor, cause the multi-instance PLC device to determine media access control (MAC) addresses associated with each of the one or more network devices.

23. The multi-instance PLC device of claim 17, wherein the instructions, when executed by the processor, cause the multi-instance PLC device to determine identification information associated with the one or more network devices of the first communication network, the identification information based, at least in part, on the at least one response message, wherein the identification information comprises addresses of the one or more network devices and a network identifier of the first communication network.

24. The multi-instance PLC device of claim 17, wherein the instructions, when executed by the processor, cause the multi-instance PLC device to:
receive a first message from a source device;
broadcast the first message via the plurality of virtual PLC devices to each corresponding communication network;
receive a response to the first message from a destination device; and
update a first mapping table with network information associated with the destination device based, at least in part, on the response to the first message.

25. The multi-instance PLC device of claim 24, wherein the first message is an address resolution protocol request and the response to the first message is an address resolution protocol response.

26. The multi-instance PLC device of claim 17, wherein the instructions, when executed by the processor, cause the multi-instance PLC device to rebroadcast the discovery message in response to a time-out period expiring without the at least one response message being received from the one or more network devices.

27. The multi-instance PLC device of claim 17, wherein the instructions, when executed by the processor, cause the multi-instance PLC device to construct a powerline data frame for transmission by the virtual PLC device, the powerline data frame including a network identifier associated with the first communication network.

28. The multi-instance PLC device of claim 27, wherein the powerline data frame includes a source terminal equipment identifier (STEI), a destination terminal equipment identifier (DTEI), and a short network identification (SNID).

29. A non-transitory machine-readable medium having instructions stored therein, which when executed by a processor causes the processor to perform operations that comprise:
executing, at a multi-instance powerline communication (PLC) device, a plurality of virtual PLC devices, wherein each virtual PLC device communicates with a different corresponding communication network via a same powerline medium;
broadcasting, using a virtual PLC device of the plurality of virtual PLC devices, a discovery message for a first communication network; and
receiving at least one response message from one or more network devices in the first communication network in response to the discovery message; and
associating each of the one or more network devices with the first communication network and with the virtual PLC device based, at least in part, on receiving the at least one response message.

30. The non-transitory machine-readable medium of claim 29, wherein the operations further comprise:
creating a first mapping table to map each network device with a corresponding communication network; and
creating a second mapping table to map each communication network with a corresponding virtual PLC device.

31. The non-transitory machine-readable medium of claim 29, wherein the operations for associating the one or more network devices comprise:
determining identification information associated with the one or more network devices of the first communication network, the identification information based, at least in part, on the at least one response message; and
storing, at the multi-instance PLC device, the identification information in association with a network identifier of the first communication network.

32. The non-transitory machine-readable medium of claim 29, wherein the operations for associating the one or more network devices comprise:
storing, at the multi-instance PLC device, network identifiers of each of a plurality of communication networks in association with a corresponding one of plurality of virtual PLC devices.

33. The non-transitory machine-readable medium of claim 29, wherein the operations further comprise:
rebroadcasting the discovery message in response to a time-out period expiring without the at least one response message being received from the one or more network devices.

34. The non-transitory machine-readable medium of claim 29, wherein the operations further comprise:
constructing a powerline data frame for transmission by the virtual PLC device, the powerline data frame including a network identifier associated with the first communication network.

35. The non-transitory machine-readable medium of claim 34, wherein the powerline data frame includes a source terminal equipment identifier (STEI), a destination terminal equipment identifier (DTEI), and a short network identification (SNID).

* * * * *